(12) United States Patent
Akada

(10) Patent No.: US 10,011,520 B2
(45) Date of Patent: Jul. 3, 2018

(54) ULTRAVIOLET-ABSORBING GLASS ARTICLE

(71) Applicant: ASAHI GLASS COMPANY, LIMITED, Chiyoda-ku (JP)

(72) Inventor: Shuichi Akada, Tokyo (JP)

(73) Assignee: ASAHI GLASS COMPANY, LIMITED, Chiyoda-ku (JP)

( * ) Notice: Subject to any disclaimer, the term of this patent is extended or adjusted under 35 U.S.C. 154(b) by 0 days.

(21) Appl. No.: 15/450,231

(22) Filed: Mar. 6, 2017

(65) Prior Publication Data

US 2017/0174552 A1 Jun. 22, 2017

Related U.S. Application Data

(63) Continuation of application No. PCT/JP2015/075109, filed on Sep. 3, 2015.

(30) Foreign Application Priority Data

Sep. 8, 2014 (JP) .................. 2014-182121

(51) Int. Cl.
*C03C 3/087* (2006.01)
*C03C 4/02* (2006.01)
*C03C 4/08* (2006.01)

(52) U.S. Cl.
CPC ............... *C03C 3/087* (2013.01); *C03C 4/02* (2013.01); *C03C 4/085* (2013.01); *C03C 2204/00* (2013.01)

(58) Field of Classification Search
CPC .............. C03C 3/087; C03C 4/02; C03C 4/08
See application file for complete search history.

(56) References Cited

U.S. PATENT DOCUMENTS

| | | | |
|---|---|---|---|
| 5,411,922 A | 5/1995 | Jones | |
| 5,780,372 A | 7/1998 | Higby | |
| 5,827,344 A | 10/1998 | Fyles et al. | |
| 6,071,840 A | 6/2000 | Sasage et al. | |
| 6,413,893 B1 | 7/2002 | Shelestak et al. | |
| 2004/0038799 A1 | 2/2004 | Landa et al. | |
| 2013/0105722 A1 | 5/2013 | Tsuzuki et al. | |
| 2014/0099501 A1* | 4/2014 | Yamamoto | C03C 3/085 428/335 |
| 2014/0113141 A1* | 4/2014 | Yamamoto | C03C 3/085 428/410 |
| 2014/0249014 A1 | 9/2014 | Lee et al. | |

FOREIGN PATENT DOCUMENTS

| | | | | |
|---|---|---|---|---|
| JP | 8-245238 | 9/1996 | | |
| JP | 9-208229 | 8/1997 | | |
| JP | 9-509391 | 9/1997 | | |
| JP | 11-504614 | 4/1999 | | |
| JP | 11-217234 | 8/1999 | | |
| JP | 2000-247679 | 9/2000 | | |
| JP | 2003-508338 | 3/2003 | | |
| JP | 2011-251882 | 12/2011 | | |
| WO | WO-0117920 A1 * | 3/2001 | ............. | C03C 3/087 |
| WO | WO-2012124757 A1 * | 9/2012 | ............. | C03C 3/085 |
| WO | WO-2012124774 A1 * | 9/2012 | ............. | C03C 3/085 |
| WO | WO 2013/022225 A2 | 2/2013 | | |

OTHER PUBLICATIONS

International Search Report dated Nov. 24, 2015 in PCT/JP2015/075109, filed on Sep. 3, 2015 (with English Translation).
Written Opinion dated Nov. 24, 2015 in PCT/JP2015/075109, filed on Sep. 3, 2015.

\* cited by examiner

*Primary Examiner* — Elizabeth A. Bolden
(74) *Attorney, Agent, or Firm* — Oblon, McClelland, Maier & Neustadt, L.L.P.

(57) ABSTRACT

The present invention relates to an ultraviolet-absorbing glass article containing, as represented by mass % based on oxides, as a glass matrix composition: $SiO_2$: 66 to 75%, $Na_2O$: 10 to 20%, CaO: 5 to 15%, MgO: 0 to 6%, $Al_2O_3$: 0 to 5%, $K_2O$: 0 to 5%, FeO: 0.2 to 1.2%, total iron as represented by $Fe_2O_3$: 2.4 to 4%, and $TiO_2$: more than 0% and 1% or less, containing from 50 to 400 mass ppm of CoO, containing from 0 to 70 mass ppm of Se, containing from 0 to 800 mass ppm of $Cr_2O_3$, having a total content of CoO, Se and $Cr_2O_3$ of less than 0.1 mass %, and having an ultraviolet transmittance (TUV) (ISO9050:2003) of 2% or less at a thickness of 3.5 mm.

20 Claims, No Drawings

ULTRAVIOLET-ABSORBING GLASS ARTICLE

TECHNICAL FIELD

The present invention relates to an ultraviolet-absorbing glass article suitable as a dark gray glass for vehicles (particularly for automobiles).

BACKGROUND ART

As a rear side glass and a rear glass of glass for automobiles, a deep gray glass having a remarkably decreased visible light transmittance (so-called dark gray-colored glass or privacy glass) has been practically used. Such a privacy glass is excellent in interior comfortableness, reduction in air-conditioning load, possible selection of color tone which imparts a high-class feeling, designing ability excellent in view of design, car interior privacy protection, and the like, due to a high sunlight shielding performance in a wide wavelength region from an ultraviolet region to an infrared region.

Patent Document 1 and Patent Document 2 disclose conventional privacy glass.

Patent Document 1 discloses an infrared-absorbing and ultraviolet-absorbing glass article which uses components that act as an infrared absorbing material, an ultraviolet-absorbing material and a coloring agent in addition to components of soda-lime silica glass. This glass article is colored green, and has a light transmittance of about 60% or less, a total solar ultraviolet transmittance of about 40% or less, a total solar infrared transmittance of about 45% or less, and a total solar energy transmittance of about 50% or less. Patent Document 2 discloses a glass article having a total solar ultraviolet transmittance of 1% or less.

PRIOR ART DOCUMENTS

Patent Document

Patent Document 1: JP-T-2003-508338
Patent Document 2: WO 2013/022225

SUMMARY OF THE INVENTION

Problems that the Invention is to Solve

In recent years, attention to measures against ultraviolet rays has been increasing. In order to cope with it, a privacy glass with a lower ultraviolet transmittance (TUV) has been desired. On the other hand, for safety driving, it is also required to secure the rear visibility.

However, although the glass in Patent Document 1 satisfies such a low ultraviolet transmittance (TUV), it cannot satisfy the requirement in view of securing visibility since the color is darkened. Furthermore, according to studies done by the present inventor, as for the glass in Patent Document 2, glass production is difficult in some cases owing to high temperature (1,443° C.) at which the viscosity reaches 100 poises.

In order to solve the above-described problems, an object of the present invention is to provide an ultraviolet-absorbing glass article which is easy to produce and suitable as a privacy glass for vehicles, has a low ultraviolet transmittance (TUV), and satisfies the requirement for securing visibility.

Means for Solving the Problems

In order to achieve the above object, the present invention provides an ultraviolet-absorbing glass article containing, as represented by mass % based on oxides, as a glass matrix composition:
  $SiO_2$: 66 to 75%,
  $Na_2O$: 10 to 20%,
  CaO: 5 to 15%,
  MgO: 0 to 6%,
  $Al_2O_3$: 0 to 5%,
  $K_2O$: 0 to 5%,
  FeO: 0.2 to 1.2%,
  total iron as represented by $Fe_2O_3$: 2.4 to 4%, and
  $TiO_2$: more than 0% and 1% or less,
containing from 50 to 400 mass ppm of CoO,
containing from 0 to 70 mass ppm of Se,
containing from 0 to 800 mass ppm of $Cr_2O_3$,
having a total content of CoO, Se and $Cr_2O_3$ of less than 0.1 mass %, and
having an ultraviolet transmittance (TUV) (ISO9050:2003) of 2% or less at a thickness of 3.5 mm.

The ultraviolet-absorbing glass article of the present invention may further contain from 0 to 1 mass % of NiO.

The ultraviolet-absorbing glass article of the present invention preferably has an ultraviolet transmittance (TUV) (ISO 9050:2003) of 2% or less at a thickness of 2.5 mm.

The ultraviolet-absorbing glass article of the present invention preferably has a visible light transmittance (TVA) (JIS-R3106 (1998)) of 5% or more and 15% or less at a thickness of 3.5 mm as measured by using a standard illuminant A.

The ultraviolet-absorbing glass article of the present invention preferably has a visible light transmittance (TVA) (JIS-R3106 (1998)) of 12% or more and 26% or less at a thickness of 2.5 mm as measured by using a standard illuminant A.

The ultraviolet-absorbing glass article of the present invention preferably has a solar radiation transmittance (TE) (JIS-R3106 (1998)) of 20% or less at a thickness of 3.5 mm.

The ultraviolet-absorbing glass article of the present invention preferably has a solar radiation transmittance (TE) (JIS-R3106 (1998)) of 35% or less at a thickness of 2.5 mm.

The ultraviolet-absorbing glass article of the present invention preferably has a dominant wavelength (λD) of from 485 to 580 nm as measured by using a standard illuminant C and an excitation purity (Pe) of 45% or less as measured by using a standard illuminant C at a thickness of 3.5 mm.

The ultraviolet-absorbing glass article of the present invention preferably has a dominant wavelength (λD) of from 485 to 580 nm as measured by using a standard illuminant C and an excitation purity (Pe) of 35% or less as measured by using a standard illuminant C at a thickness of 2.5 mm.

Advantageous Effects of the Invention

The present invention provides an ultraviolet-absorbing glass article which is easy to produce and suitable as a privacy glass for vehicles, has a low ultraviolet transmittance (TUV), and satisfies a requirement for securing visibility.

MODE FOR CARRYING OUT THE INVENTION

The ultraviolet-absorbing glass article of the present invention (hereinafter, sometimes referred to as the glass of the invention) contains, as represented by mass % based on oxides, as a glass matrix composition, $SiO_2$: 66 to 75%, $Na_2O$: 10 to 20%, CaO: 5 to 15%, MgO: 0 to 6%, $Al_2O_3$: 0 to 5%, $K_2O$: 0 to 5%, FeO: 0.2 to 1.2%, total iron as represented by $Fe_2O_3$: 2.4 to 4%, and $TiO_2$: more than 0% and 1% or less, contains from 50 to 400 mass ppm of CoO, contains from 0 to 70 mass ppm of Se, contains from 0 to 800 mass ppm of $Cr_2O_3$, has a total content of CoO, Se and $Cr_2O_3$ of less than 0.1 mass %, and has an ultraviolet transmittance (TUV) (ISO9050:2003) of 2% or less at a thickness of 3.5 mm.

The reason why the content of each component in the glass of the invention is limited is described below. Incidentally, % means mass %, and ppm means mass ppm unless otherwise specified.

$SiO_2$ is a component that constitutes the network and is an essential component. In the case where the content of $SiO_2$ is 66% or more, weather resistance becomes good, and in the case where it is 75% or less, the viscosity is not too high and is convenient for melting. It is preferably 66% or more and 72% or less, and more preferably 67% or more and 70% or less.

$Na_2O$ is a component that accelerates melting of raw materials and is an essential component. In the case where the content of $Na_2O$ is 10% or more, melting of raw materials is accelerated, and in the case where it is 20% or less, the weather resistance is not impaired. It is preferably 11% or more and 18% or less, and more preferably 12% or more and 16% or less.

CaO is a component that accelerates melting of raw materials and improves the weather resistance, and is an essential component. In the case where the content of CaO is 5% or more, melting of raw materials is accelerated and the weather resistance is improved, and in the case where it is 15% or less, devitrification is suppressed. It is preferably 6% or more and 13% or less, and more preferably 7% or more and 11% or less.

MgO is a component that accelerates melting of raw materials and improves the weather resistance, and is a selected component. In the case where the content of MgO is 6% or less, devitrification is suppressed. It is preferably 5% or less, and more preferably 4% or less.

$Al_2O_3$ is a component that improves the weather resistance and is a selected component. In the case where the content of $Al_2O_3$ is 5% or less, the viscosity is not too high and is convenient for melting. It is preferably 4% or less, and more preferably 3% or less.

$K_2O$ is a component that accelerates melting of raw materials and is a selected component. In the case where the content of $K_2O$ is 5% or less, damages on a refractory of the melting furnace due to volatilization are suppressed. It is preferably 4% or less, and more preferably 3% or less.

FeO is a component that absorbs heat energy and is an essential component. In the case where the content of FeO is 0.2% or more, a sufficiently low solar radiation transmittance is obtained. On the other hand, in the case where the content is 1.2% or less, thermal efficiency at the time of melting is not deteriorated, and it is possible to prevent molten glass from staying at the bottom of the melting furnace far from the heat source. The content is preferably 0.2% or more and 0.8% or less, and more preferably 0.3% or more and 0.6% or less.

In the case where the content of total iron in terms of $Fe_2O_3$ is 2.4% or more, the visible light transmittance is not made large, and in the case where it is 4% or less, the visible light transmittance is not made small. That is, the visible light transmittance falls within an appropriate range. More preferable content of total iron is from 2.6 to 3.0%.

$TiO_2$ is a component that lowers the ultraviolet transmittance (TUV) and is an essential component. In the case where the content of $TiO_2$ is more than 0%, the ultraviolet transmittance is not made large, and in the case where it is 1% or less, yellowish color is suppressed and an increase in the excitation purity is suppressed. It is more preferably 0.5% or more and 0.9% or less.

Se is not essential, but may be contained since it is a component that makes the glass become reddish. The content of Se is preferably 3 ppm or more for preventing color tone of the glass from becoming bluish, and in the case where the content is 70 ppm or less, the color tone is prevented from becoming yellowish. The content is more preferably 5 ppm or more and 50 ppm or less, and further preferably 10 ppm or more and 30 ppm or less.

CoO is a component that makes the glass become bluish and is an essential component. In the case where the content of CoO is 50 ppm or more, the color tone of the glass is prevented from becoming yellowish, and in the case where it is 400 ppm or less, the color tone of the glass is prevented from becoming bluish. More preferable content of CoO is from 180 to 320 ppm.

$Cr_2O_3$ is a component that lowers the visible light transmittance without increasing the excitation purity so much and is an optional component, in the glass of the invention. In the case where the content of $Cr_2O_3$ is 800 ppm or less, an increase in the excitation purity is suppressed. Preferable content of $Cr_2O_3$ is 300 ppm or less.

Here, in the glass of the invention, from the viewpoint of not decreasing the visible light transmittance too much, the total amount of CoO, Se and $Cr_2O_3$ is less than 0.1%, preferably 0.08% or less, and more preferably 0.06% or less.

In practical production, since a refining agent such as salt cake is used, as a trace thereof, $SO_3$ in an amount at a level of from 0.05 to 1.0% usually remains in the glass.

The glass of the invention preferably further contains an oxide of Ni that is a component making the glass become yellow-greenish, in addition to the above components. In this case, the content in terms of an oxide (NiO) is from 0 to 1 mass %.

The glass of the invention may contain oxides of B, Ba, Sr, Li, Zn, Pb, P, Zr, and Bi, in addition to the above components. The content of each of them in terms of oxides ($B_2O_3$, BaO, SrO, $Li_2O$, ZnO, PbO, $P_2O_5$, $ZrO_2$, and $Bi_2O_3$) may be from 0 to 1 mass %.

Furthermore, Sb, As, Cl, and F may also be contained. Such elements may be intentionally mixed therein from a melting aid and/or a refining agent. Otherwise, they may be included as impurities from raw materials or cullet. The content of each of them may be from 0 to 1 mass %.

Furthermore, an oxide of Sn may also be contained. Sn comes into contact with the glass at the time of forming in float process and infiltrates into the glass. The content in terms of an oxide ($SnO_2$) may be from 0 to 0.1 mass %.

Moreover, oxides of Mn, Cu, Mo, Nd, and Er may also be contained. The content of each of them in terms of oxides ($MnO_2$, CuO, $MoO_3$, $Nd_2O_3$, and $Er_2O_3$) may be from 0 to 0.1 mass %.

Incidentally, an ultraviolet absorber such as V or W is not substantially contained. Here, "not substantially contained" means that it is not intentionally incorporated, and specifically means that the content of each of such elements is about 100 ppm or less in the glass.

In the case where the glass of the invention is used as a privacy glass for vehicles, it is preferable that the glass has the above composition and has optical properties as mentioned below.

First, a visible light transmittance (TVA) is preferably 5% or more and 15% or less, and more preferably 7% or more and 13% or less at a thickness of 3.5 mm. Furthermore, a solar radiation transmittance (TE) is preferably 20% or less, and more preferably 15% or less at a thickness of 3.5 mm.

An ultraviolet transmittance (TUV) is preferably 2% or less, and more preferably 1% at a thickness of 3.5 mm.

Furthermore, in addition to the above optical properties, at a thickness of 3.5 mm, it is preferable that a dominant wavelength λD is from 485 to 580 mu and an excitation purity is 45% or less, and particularly preferred is a glass having the excitation purity of 41% or less.

Through the present description, the solar radiation transmittance and the visible light transmittance are determined in accordance with JIS-R3106 (1998), and the ultraviolet transmittance is determined in accordance with ISO 9050 (2003). Furthermore, the visible light transmittance is calculated employing a standard illuminant A two-degree visual field, and the dominant wavelength and the excitation purity are calculated employing a standard illuminant C two-degree visual field.

In the case where the glass of the invention is used as a thin privacy glass for vehicles, it is preferable that the glass has the above composition and has optical properties as mentioned below.

A visible light transmittance (TVA) is preferably 12% or more and 26% or less, and more preferably 14% or more and 24% or less at a thickness of 2.5 mm. Furthermore, a solar radiation transmittance (TE) is preferably 35% or less, and more preferably 32% or less at a thickness of 25 mm.

An ultraviolet transmittance (TUV) is preferably 2% or less, and more preferably 1% at a thickness of 2.5 mm.

Furthermore, in addition to the above optical properties, at a thickness of 2.5 mm, it is preferable that a dominant wavelength λD is from 485 to 580 nm and an excitation purity (Pe) is 35% or less, and particularly preferred is a glass having the excitation purity (Pe) of 32% or less.

The method for producing the glass of the invention is not particularly limited, and may be produced, for example, as follows. Prepared raw materials are continuously supplied to a melting furnace and heated to about 1,500° C. by heavy oil or the like to vitrify the materials. Then, the molten glass is refined and subsequently formed into a glass sheet having a predetermined thickness by float process or the like. Then, the glass sheet is cut into a predetermined shape to thereby produce the glass of the invention. Thereafter, as required, the cut glass can be subjected to a strengthening treatment, can be processed into a laminated glass, or can be processed into a double glazing.

EXAMPLES

A raw material batch was prepared by using silica sand, feldspar, dolomite, soda ash, soda ash, blast-furnace slag, ferric oxide, titanium oxide, cobalt oxide, sodium selenite, chromium oxide, and nickel oxide as raw materials. Soda lime silicate glass composed of $SiO_2$: 65 to 70, $Al_2O_3$: 1.8, CaO: 8.4, MgO: 4.6, $Na_2O$: 13.3, $K_2O$: 0.7, and $SO_3$: 0.2 (unit: mass %) was used as matrix components. The $SiO_2$ content was adjusted to obtain a target composition so that the total amount of the matrix components and t-$Fe_2O_3$ (total iron in terms of $Fe_2O_3$), CoO, Se, $TiO_2$, $Cr_2O_3$, and NiO which were added as absorbing components would be 100 mass %. The batch was put in a platinum-rhodium crucible and melted in an electric furnace (an atmosphere at an $O_2$ concentration of about 0.5%), poured on a carbon plate, and annealed in another electric furnace. The obtained glass block was cut, and a part thereof was polished and the composition was analyzed by a fluorescent X-ray spectroscopic analyzer. As for another part thereof, the surface was mirror-polished and finished to such thickness (3.5 mm or 2.5 mm) as described in the following Table 1, and the spectral transmittance was measured by a spectrophotometer. Incidentally, as for FeO, determination was performed by calculation from the infrared transmittance at a wavelength of 1,000 nm. Table 1 below shows the contents of the absorbing components in each obtained glass, optical properties in the case where the thickness is 3.5 mm and optical properties in the case where the thickness is 2.5 mm.

TABLE 1

| | | 1 | 2 | 3 | 4 | 5 | 6 | 7 | 8 |
|---|---|---|---|---|---|---|---|---|---|
| Composition/ mass % | t-$Fe_2O_3$ | 2.79 | 2.73 | 2.51 | 2.76 | 3.00 | 3.50 | 2.45 | 2.70 |
| /mass % | $TiO_2$ | 0.32 | 0.51 | 0.83 | 0.83 | 0.80 | 0.80 | 0.10 | 0.62 |
| /mass ppm | CoO | 309 | 254 | 301 | 256 | 320 | 180 | 309 | 139 |
| /mass ppm | Se | 27 | 13 | 26 | 26 | 26 | 26 | 5 | 8 |
| /mass ppm | $Cr_2O_3$ | 0 | 0 | 0 | 0 | 100 | 0 | 0 | 0 |
| /mass % | FeO | 0.383 | 0.404 | 0.363 | 0.392 | 0.450 | 0.550 | 0.485 | 0.466 |
| /mass ppm | NiO | 0 | 0 | 0 | 0 | 0 | 0 | 0 | 154 |
| Sheet thickness/mm | | 3.5 | 3.5 | 3.5 | 3.5 | 3.5 | 3.5 | 3.5 | 3.5 |
| Optical properties/% | TVA | 9.5 | 13.5 | 10.0 | 10.4 | 5.6 | 5.4 | 7.8 | 14.5 |
| /% | TE | 10.4 | 11.2 | 11.2 | 10.3 | 7.4 | 5.3 | 7.9 | 9.8 |
| /% | TUV | 0.04 | 0.06 | 0.05 | 0.02 | 0.01 | 0.01 | 0.42 | 0.06 |
| /nm | λD | 570.7 | 565.2 | 571.5 | 573.2 | 567.3 | 568.5 | 561.5 | 571.0 |
| /% | Pe | 30.4 | 22.7 | 30.2 | 41.0 | 29.6 | 43.5 | 11.4 | 44.3 |
| Sheet thickness/mm | | 2.5 | 2.5 | 2.5 | 2.5 | 2.5 | 2.5 | 2.5 | 2.5 |
| Optical properties/% | TVA | 17.9 | 23.4 | 18.9 | 19.4 | 12.5 | 12.1 | 15.8 | 24.5 |
| /% | TE | 18.5 | 19.9 | 19.9 | 18.6 | 15.2 | 12.1 | 16.0 | 17.8 |
| /% | TUV | 0.30 | 0.40 | 0.40 | 0.20 | 0.11 | 0.03 | 1.94 | 0.47 |
| /nm | λD | 570.7 | 565.4 | 571.4 | 572.9 | 567.3 | 568.5 | 561.5 | 570.9 |
| /% | Pe | 22.5 | 16.6 | 22.1 | 30.6 | 21.1 | 31.1 | 8.2 | 33.7 |

While the present invention has been described in detail and with reference to specific embodiments thereof, it will be apparent to one skilled in the art that various changes and modifications can be made therein without departing from the spirit and scope of the present invention.

Incidentally, the present application is based on Japanese Patent Application (No. 2014-182121) filed on Sep. 8, 2014, and the whole contents thereof are incorporated herein by reference.

The invention claimed is:

1. An ultraviolet-absorbing glass article comprising, as represented by mass% based on oxides, as a glass matrix composition:

$SiO_2$: 66 to 75%,
$Na_2O$: 10 to 20%,
CaO: 5 to 15%,
MgO: 0 to 6%,
$Al_2O_3$: 0 to 5%,
$K_2O$: 0 to 5%,
FeO: 0.2 to 1.2%,
total iron as represented by $Fe_2O_3$: 2.4 to 4%, and
$TiO_2$: more than 0% and 1% or less,
containing from 180 to 400 mass ppm of CoO,
containing from 0 to 70 mass ppm of Se,
containing from 0 to 800 mass ppm of $Cr_2O_3$,
having a total content of CoO, Se and $Cr_2O_3$ of less than 0.1 mass %,
having an ultraviolet transmittance (TUV) (ISO9050: 2003) of 2% or less at a thickness of 3.5 mm, and
having a visible light transmittance (TVA) (JIS-R3106 (1998)) of 5% to 15% at a thickness of 3.5 mm as measured by using a standard illuminant A.

2. The ultraviolet-absorbing glass article according to claim 1, further comprising from 0 to 1 mass % of NiO.

3. The ultraviolet-absorbing glass article according to claim 1, wherein the content of total iron as represented by $Fe_2O_3$ is 2.7 mass % or more.

4. The ultraviolet-absorbing glass article according to claim 1, wherein the content of total iron as represented by $Fe_2O_3$ is 3.0 mass % or less.

5. The ultraviolet-absorbing glass article according to claim 1, wherein the content of total iron as represented by $Fe_2O_3$ is 2.7 to 3.0 mass %.

6. The ultraviolet-absorbing glass article according to claim 1, wherein the content of FeO is 0.6 mass % or less.

7. The ultraviolet-absorbing glass article according to claim 1, wherein the content of Se is 3 mass ppm or more.

8. The ultraviolet-absorbing glass article according to claim 1, comprises from 0 to 1 mass % of at least one selected from the group consisting of Sb, As, Cl, and F.

9. The ultraviolet-absorbing glass article according to claim 1, having a dark gray color.

10. The ultraviolet-absorbing glass article according to claim 1, having an ultraviolet transmittance (TUV) (ISO 9050:2003) of 2% or less at a thickness of 2.5 mm.

11. The ultraviolet-absorbing glass article according to claim 1, having a visible light transmittance (TVA) (JIS-R3106 (1998)) of 12% or more and 26% or less at a thickness of 2.5 mm as measured by using a standard illuminant A.

12. The ultraviolet-absorbing glass article according to claim 1, having a solar radiation transmittance (TE) (JIS-R3106 (1998)) of 35% or less at a thickness of 2.5 mm.

13. The ultraviolet-absorbing glass article according to claim 1, having a dominant wavelength (λD) of from 485 to 580 nm as measured by using a standard illuminant C and an excitation purity (Pe) of 35% or less as measured by using a standard illuminant C at a thickness of 2.5 mm.

14. The ultraviolet-absorbing glass article according to claim 1, having the visible light transmittance (TVA) (JIS-R3106 (1998)) of 5% or more and 15% or less at a thickness of 3.5 mm as measured by using a standard illuminant A.

15. The ultraviolet-absorbing glass article according to claim 1, having the visible light transmittance (TVA) (JIS-R3106 (1998)) of 14.5% or less at a thickness of 3.5 mm as measured by using a standard illuminant A.

16. The ultraviolet-absorbing glass article according to claim 1, having the visible light transmittance (TVA) (JIS-R3106 (1998)) of 13% or less at a thickness of 3.5 mm as measured by using a standard illuminant A.

17. The ultraviolet-absorbing glass article according to claim 1, having the visible light transmittance (TVA) (JIS-R3106 (1998)) of 7% or more and 13% or less at a thickness of 3.5 mm as measured by using a standard illuminant A.

18. The ultraviolet-absorbing glass article according to claim 1, having a solar radiation transmittance (TE) (JIS-R3106 (1998)) of 20% or less at a thickness of 3.5 mm.

19. The ultraviolet-absorbing glass article according to claim 1, having a dominant wavelength (λD) of from 485 to 580 nm as measured by using a standard illuminant C and an excitation purity (Pe) of 45% or less as measured by using a standard illuminant C at a thickness of 3.5 mm.

20. The ultraviolet-absorbing glass article according to claim 1, having a dominant wavelength (λD) of 561.5 nm to 580 nm as measured by using a standard illuminant C and an excitation purity (Pe) of 45% or less as measured by using a standard illuminant C at a thickness of 3.5 mm.

* * * * *